(12) United States Patent
Aoki et al.

(10) Patent No.: US 9,293,165 B2
(45) Date of Patent: Mar. 22, 2016

(54) THERMALLY ASSISTED MAGNETIC RECORDING HEAD WITH MAGNETIC CIRCUIT PARALLEL TO SUBSTRATE

(71) Applicant: TDK Corporation, Tokyo (JP)

(72) Inventors: Susumu Aoki, Tokyo (JP); Takafumi Kobayashi, Tokyo (JP); Ryo Hosoi, Tokyo (JP); Kei Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 94 days.

(21) Appl. No.: 14/204,020

(22) Filed: Mar. 11, 2014

(65) Prior Publication Data
US 2015/0262594 A1 Sep. 17, 2015

(51) Int. Cl.
| | |
|---|---|
| G11B 5/00 | (2006.01) |
| G11B 5/60 | (2006.01) |
| G11B 5/187 | (2006.01) |
| G11B 5/31 | (2006.01) |
| G11B 5/11 | (2006.01) |
| G11B 5/127 | (2006.01) |

(52) U.S. Cl.
CPC .............. *G11B 5/6088* (2013.01); *G11B 5/187* (2013.01); *G11B 5/314* (2013.01); *G11B 5/11* (2013.01); *G11B 5/1278* (2013.01); *G11B 2005/0021* (2013.01)

(58) Field of Classification Search
None
See application file for complete search history.

(56) References Cited

U.S. PATENT DOCUMENTS

2010/0103553 A1    4/2010   Shimazawa et al.

*Primary Examiner* — Brian Butcher
(74) *Attorney, Agent, or Firm* — Posz Law Group, PLC

(57) ABSTRACT

A recording head has a near field light (NF light) generator generating NF light on a generator end surface that irradiates a magnetic recording (MR) medium; a main magnetic pole including a pole end surface facing an air bearing surface (ABS) that emits magnetic flux to the MR medium from the pole end surface; and a return shield having a shield end surface facing the ABS, that is magnetically linked with the main magnetic pole, and absorbs magnetic flux from the MR medium at the shield end surface. The pole end surface and the shield end surface are on the same side of the generator end surface in the down track direction, and are close to each other in the track crossing direction. A center line in the down track direction of the generator end surface extends between opposing sides of the pole end surface and the shield end surface.

13 Claims, 7 Drawing Sheets

THERMALLY ASSISTED MAGNETIC RECORDING HEAD WITH MAGNETIC CIRCUIT PARALLEL TO SUBSTRATE

BACKGROUND OF THE INVENTION

1. Field of the Invention

The present invention relates to a thermally assisted magnetic recording head, and in particular relates to the configuration of a magnetic circuit used for recording.

2. Description of the Related Art

Recently, in a magnetic recording device typified by a magnetic disk apparatus, in association with high recording density, there is a demand for improvement in the performance of thin film magnetic heads and magnetic recording media. As the thin film magnetic head, composite type thin film magnetic heads are widely used in which a reproducing head having a magneto-resistive effect element (MR element) for reading, and a recording head having an induction-type electromagnetic transducer element for writing, are laminated on a substrate.

The magnetic recording medium is a discontinuous medium where magnetic grains are aggregated, and each magnetic grain has a single magnetic domain structure. Each recording bit on the magnetic recording medium is configured by a plurality of magnetic grains. In order to increase the recording density, asperities at a border between adjacent recording bits need to be decreased by decreasing the size of the magnetic grains. On the other hand, decreasing the size of the magnetic grains, i.e., decreasing in the volumes of the magnetic grains, results in a decrease in the thermal stability of magnetization in the magnetic grains. In order to resolve this problem, it is effective to increase the anisotropic energy of the magnetic grains. However, the greater anisotropic energy of the magnetic grains enhances the coercive force of the magnetic grains, making it difficult to record the information on an existing magnetic head.

As a method of resolving this problem, a so-called thermally assisted magnetic recording is proposed. In this method, a magnetic recording medium with a high coercive force can be used. At the time of recording information, the simultaneous addition of a magnetic field and heat to a portion of the recording medium where information is recorded increases the temperature of that portion. This results in information being recorded by the magnetic field at the portion where the coercive force is decreased. Hereafter, the magnetic head used for thermally assisted magnetic recording is referred to as a thermally assisted magnetic recording head.

In thermally assisted magnetic recording, near-field light (NF light) is used in general as a means for adding heat to the magnetic recording medium. The NF light is a type of electromagnetic field formed around a material, and is not restricted by a diffraction limit due to light wavelength. As a result, it is possible to focus light onto a very small domain on the order of tens of nm.

A thermally assisted magnetic recording head using a NF light generator is described in US2010/0103553. A magnetic circuit that applies a magnetic field to a magnetic recording medium extends with a roughly U-shaped form within a plane that is orthogonal to an air bearing surface (ABS) of the magnetic head and the substrate, a magnetic flux is emitted from one end of the U-shape, and the magnetic flux is absorbed from the other end. An NF light generator is positioned inside the U-shape within the plane, i.e., is positioned between both ends of the magnetic circuit when viewed in the track direction. As a result, the magnetic flux emitted from one end of the magnetic circuit passes through the NF light generator after entering into the magnetic recording medium, and is again absorbed by the magnetic circuit at the other end of the magnetic circuit.

In a conventional thermally assisted magnetic recording head having such a positional relationship between the NF light generator and the magnetic circuit, the below mentioned problem occurs. In order to efficiently perform magnetic recording on the magnetic recording medium, it is effective to enhance the effective magnetic gradient in the down track direction (recording medium circumferential direction). The effective magnetic gradient relies upon both the magnetic gradient in the down track direction formed by the magnetic circuit and the temperature gradient of the magnetic recording medium in the down track direction formed by the NF light generator. In a conventional thermally assisted magnetic recording head, although high magnetic field intensity is obtained between both ends of the magnetic circuit, fluctuation of the magnetic field intensity in the down track direction is not so great. Therefore, in the thermally assisted magnetic recording head where the NF light generator is positioned between both ends of the magnetic circuit, it is difficult to obtain a high magnetic gradient by the magnetic circuit in the vicinity where the NF light generator is positioned.

The objective of the present invention is to provide a thermally assisted magnetic recording head that can obtain a high magnetic gradient by a magnetic circuit in the vicinity where an NF light generator is positioned.

SUMMARY OF THE INVENTION

The thermally assisted recording head of the present invention has a near field light (NF light) generator that includes a generator end surface facing an air bearing surface (ABS), that generates NF light on the generator end surface, and that irradiates a magnetic recording medium with the NF light;

a main magnetic pole that includes a main magnetic pole end surface facing the ABS and positioned in the vicinity of the generator end surface, and that emits a magnetic flux to the magnetic recording medium from the main magnetic pole end surface; and a return shield that includes a shield end surface facing the ABS and positioned in the vicinity of the generator end surface, that is magnetically linked with the main magnetic pole, and that absorbs a magnetic flux returning from the magnetic recording medium at the shield end surface. The main magnetic pole end surface and the shield end surface are positioned on the same side with respect to the generator end surface in the down track direction, and are positioned in the vicinity of each other in the track crossing direction, and a center line of the generator end surface extending in the down track direction extends between the opposing sides of the main magnetic pole end surface and the shield end surface.

The main magnetic pole end surface and the shield end surface are positioned on the same side in the down track direction (recording medium circumferential direction) with respect to the generator end surface, and, positioned close to each other in the cross track direction (recording medium radius direction). Consequently, the thermally assisted magnetic recording head of the present invention has a positional relationship where a conventional shield end surface is rotated around the main magnetic pole end surface by 90 degrees; i.e., a positional relationship where the main magnetic pole end surface and the shield end surface are arranged side-by-side in the cross track direction. Although the strong magnetic field intensity mainly appears along the cross track direction, a large magnetic gradient appears between the main pole end surface and the shield end surface along the down track direction, which is orthogonal to the cross track direction. Since the main magnetic end surface and the shield end surface are positioned close to each other in the cross track direction, sufficient magnetic field intensity can be obtained in the cross track direction; therefore, a sufficient magnetic gradient can be ensured in the down track direction. In addition, since the center line of the generator end surface extending in the down track direction extends between the opposing sides of the main magnetic pole end surface and the shield end surface, the NF light can be irradiated to the position where a great magnetic gradient in the down track direction can be obtained. Consequently, it is possible to obtain a greater magnetic gradient by the magnetic circuit in the vicinity where the NF light generator is positioned.

According to another mode of the present invention, the thermally assisted magnetic recording head has an NF light generator that includes a generator end surface facing the ABS, and that generates NF light at the generator end surface and irradiates a magnetic recording medium with the NF light; and a magnetic circuit that circulates roughly parallel to a substrate with the opened shape having two end surfaces that are close to each other in the cross track direction and face the ABS, where one end surface configures a main magnetic pole end surface that emits a magnetic flux to the magnetic recording medium and the other end surface configures a shield end surface that absorbs the magnetic flux returning from the magnetic recording medium. The center line of the generator end surface extending in the down track direction extends between the opposing sides of the main magnetic pole end surface and the shield end surface.

According to another mode of the present invention, the thermally assisted magnetic recording head has
a substrate;
an NF light generator that is positioned within a first region surrounded by two planes extending parallel to an integrated surface of the substrate, and that includes a generator end surface facing the ABS, and that generates NF light at a generator end surface and irradiates a magnetic recording medium with the NF light; and
a magnetic circuit that is positioned within a second region, which is surrounded by two planes extending parallel to an integrated surface of the substrate, and which is separated from the first region, and that circulates with an open shape having two end surfaces that are close to each other in the cross track direction and face the ABS; and where one end surface configures a main magnetic pole end surface that emits a magnetic flux to the magnetic recording medium and the other end surface configures a shield end surface that absorbs the magnetic flux returning from the magnetic recording medium. The center line of the generator end surface extending along the down track direction extends between opposing sides of the main magnetic pole end surface and the shield end surface.

The above mentioned or other objective, characteristics and advantages of the present invention will become clear from the following explanation by referring to the attached drawings where the present invention is exemplified.

DETAILED DESCRIPTION OF THE INVENTION

Figure 1:
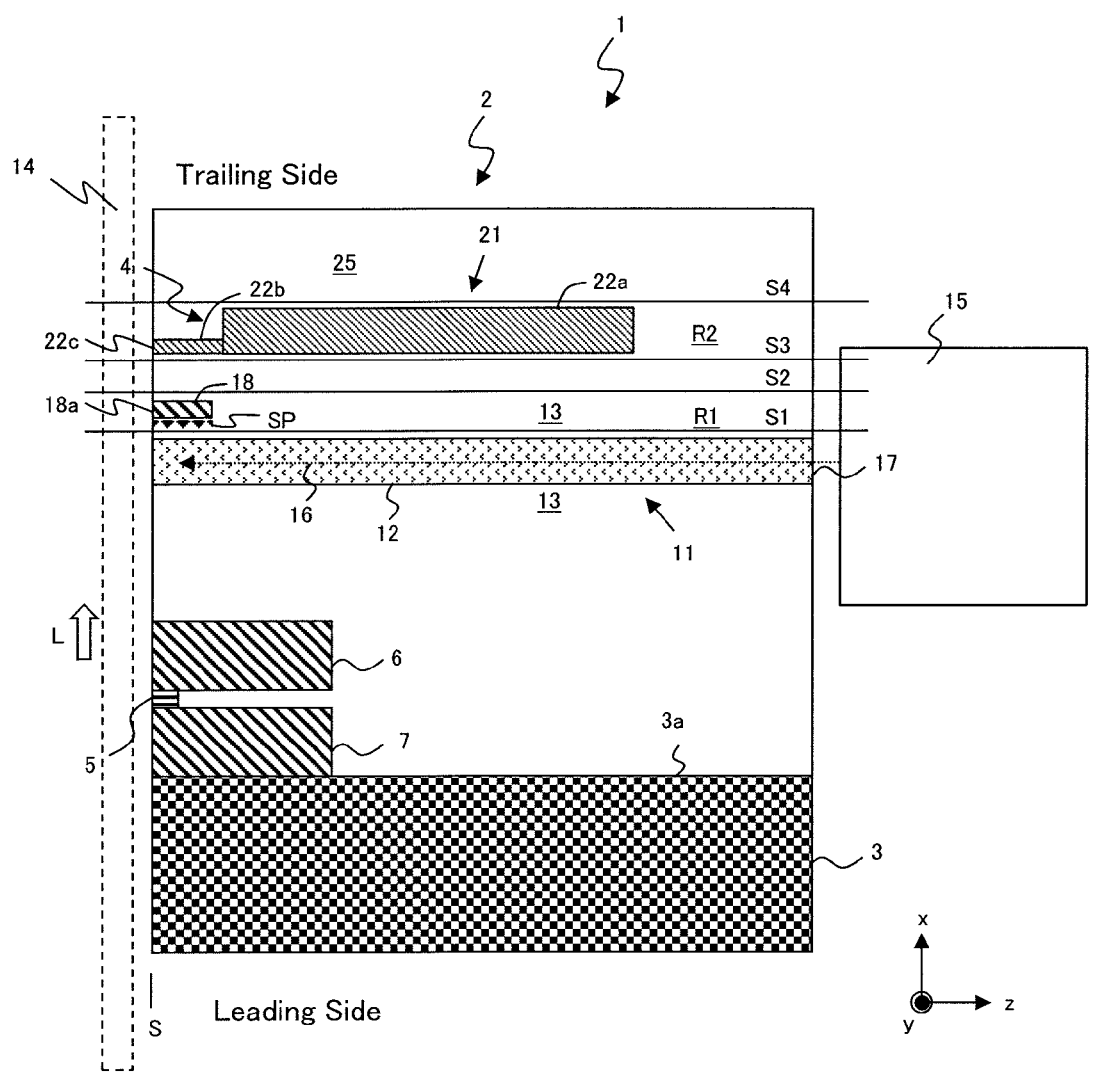
FIG. 1 is a conceptual cross-sectional view of a thermally assisted magnetic recording head relating to one embodiment of the present invention.
Figure 2:
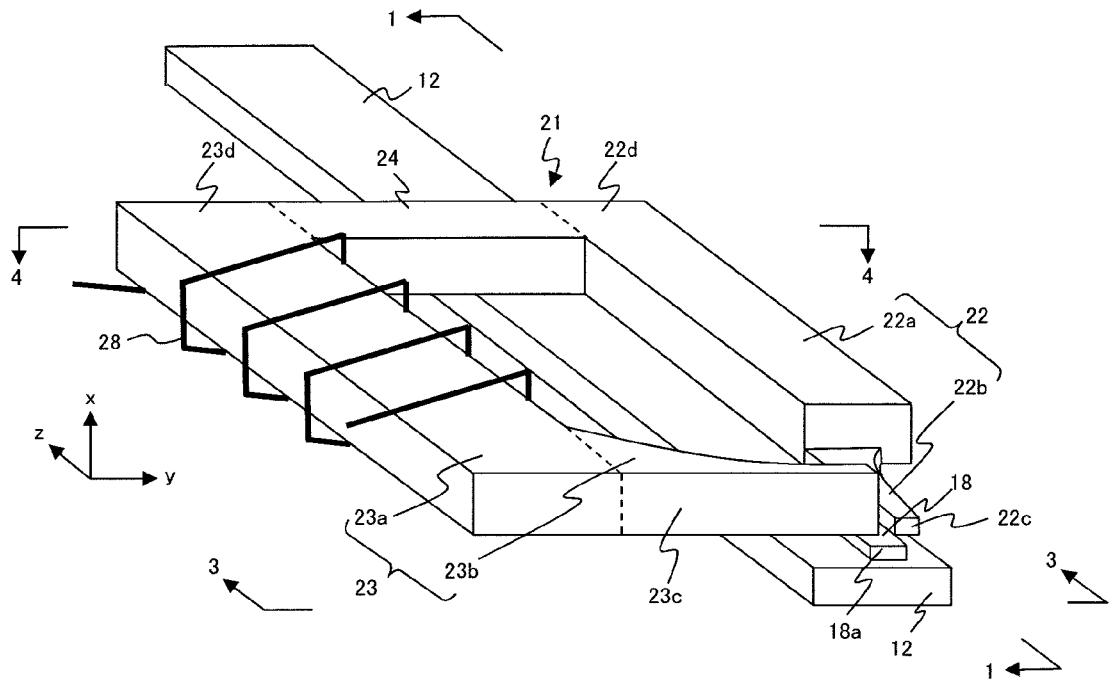
FIG. 2 is a main part perspective view of the thermally assisted magnetic recording head shown in FIG. 1.
Figure 3:
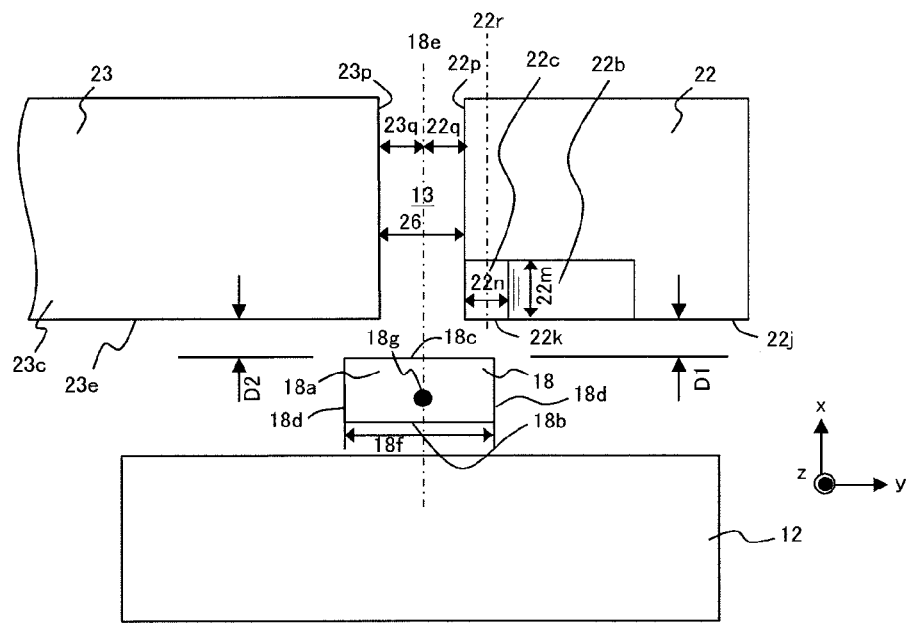
FIG. 3 is a main part side view at an air bearding surface (ABS) of the thermally assisted magnetic recording head shown in FIG. 1.
Figure 4:
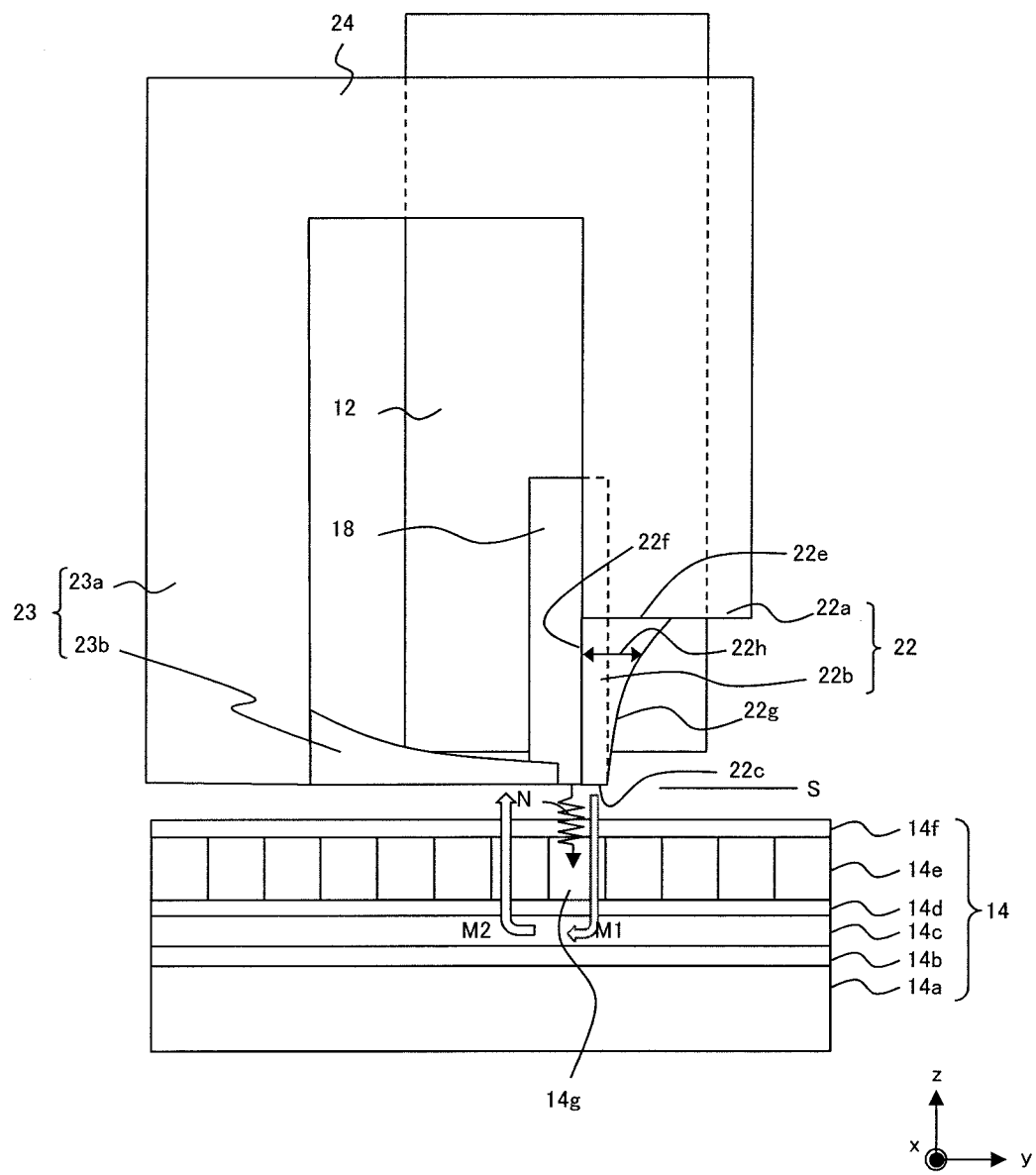
FIG. 4 is a main part plan view of the thermally assisted magnetic recording head shown in FIG. 1 viewed from the x direction.

The thermally assisted magnetic recording head of the present invention is explained hereafter with reference to the drawings. FIG. 1 is a conceptual cross-sectional view of the thermally assisted magnetic recording head along line 1-1 of FIG. 2. FIG. 2 is a perspective view of a waveguide, a near-field light (NF light) generator and a magnetic recording element; FIG. 3 is a main part side view of the waveguide, the NF light generator and the magnetic recording element on the ABS along line 3-3 of FIG. 2; and FIG. 4 is a main part plan view of the waveguide, the NF light generator, the magnetic recording element and a magnetic recording medium 14 along line 4-4 of FIG. 2 viewed from the x direction.

In the specification, the x direction refers to the down track direction (recording medium circumferential direction) or a direction that is orthogonal to an integrated surface of a substrate where a magneto resistive (MR) element and a magnetic recording element are formed; the y direction refers to the cross track direction (recording medium radius direction) of the magnetic recording medium 14; and the z direction refers to the direction that is orthogonal to the ABS of a magnetic head slider. The x direction corresponds to the film formation direction L in the wafer process, the relative movement direction of the magnetic head slider with respect to the track circumferential direction of the magnetic recording medium 14, or a tangential direction of a track at a position of the thermally assisted magnetic recording head on the magnetic recording medium 14. The x direction, the y direction and the z direction are orthogonal to each other. "Upward" and "downward" correspond to a direction away from a substrate and a direction approaching the substrate relative to the x direction, respectively. Instead of "upward," "trailing side" may be used, and instead of "downward," "leading side" may be used.

A thermally assisted magnetic recording head 1 has a magnetic head slider 2, and a laser light generator 15 that supplies a laser light to a magnetic head slider 2. The magnetic head slider 2 has a substantially hexahedral shape, one plane of which forms the ABS S that is opposite to the magnetic recording medium 14. An MR element, a waveguide, an NF light generator, a magnetic recording element explained below and the like are formed above an integrated surfaced 3a of a substrate 3 (wafer) of the magnetic head slider 2. The substrate 3 is formed with AlTiC ($Al_2O_3$—TiC).

The magnetic head slider 2 has an MR element 5 where its front end part is positioned on the ABS S, an upper side shield layer 6 and a lower side shield layer 7 provided at both sides of the MR element 5 in the x direction, respectively. The MR element 5 may be any of a current-in-plane (CIP)-gigantic magneto resistive (GMR) element where a sense current flows in the y direction, a current-perpendicular-to-plane (CPP)-GMR element where a sense current flows in the x direction and a tunneling magneto resistive (TMR) element where a sense current flows in the x direction and utilizes a flow tunnel effect. When the MR element 5 is either the CPP-GMR element or the TMR element, the upper side shield layer 6 and the lower side shield layer 7 are also utilized as an electrode that supplies a sense current, respectively.

The magnetic head slider 2 has a waveguide 11 that can propagate laser light. The waveguide 11 has a core 12 extending in the z direction and a cladding 13 covering the core 12. The core 12 propagates laser light generated at a laser light generator 15 as propagating light 16 in the z direction. The core 12 extends to the ABS S or its vicinity from an end part 17 (incident part of laser light) that is opposite to the laser light generator 15 attached to the magnetic head slider 2. The core 12 may be terminated before the ABS S, or may extend to the ABS S. A cross section of the core 12 that is orthogonal to the propagation direction (z direction) of the propagating light 16 is rectangular, and its width (dimension in the y direction) is greater than its thickness (dimension in the x direction). The core 12 may be formed with, such as TaOx. TaOx means tantalum oxide with any composition, and $Ta_2O_5$, TaO, $TaO_2$ and the like are typical, but it is not limited to these. The core 12 is covered with the cladding 13 with a smaller refractive index than the core 12. The cladding 13 can be formed with a dielectric body, such as $SiO_2$ or $Al_2O_3$.

The magnetic head slider 2 has an NF light generator 18 that generates NF light on the ABS S from the propagating light 16. The NF light generator 18 is positioned within a first region R1 surrounded by two planes S1 and S2 extending parallel to the integrated surface 3a of the substrate 3. The NF light generator 18 includes the generator end surface 18a which faces the ABS S, and extends to the generator end surface 18a along the core 12 while being opposite to a portion of the core 12. The NF light generator 18 generates NF light on the generator end surface 18a, and irradiates the magnetic recording medium 14 with the NF light. With this, the NF light generator 18 heats the portion of the magnetic recording medium 14 where information is recorded. The NF light generator 18 is formed with Au, Ag, Cu, Al, Pd, Ru, Pt, Rh and Ir, or an alloy that consists primarily of these metals. The NF light generator 18 is a roughly-quadrangular prism-shaped metallic strip having a rectangular cross section in the present embodiment. Therefore, although the generator end surface 18 is rectangular, it may be another shape, such as square, triangular or the like. Out of a bottom surface 18b, an upper surface 18c and two side surfaces 18d extending in the z direction of the NF light generator 18, the bottom surface 18b opposite to the core 12 configures a propagating surface. The propagating surface 18b couples with propagating light 16 that propagates through the core 12 in a surface plasmon mode, and generates a surface plasmon SP. The propagating surface 18b propagates the generated surface plasmon SP to the generator end surface 18a of the NF light generator 18, and generates the NF light on the generator end surface 18a.

The laser light generator 15 is positioned on a surface at the opposing side from the ABS S of the magnetic head slider 2. The laser light generator 15 emits laser light toward the waveguide 11 of the magnetic head slider 2 in the z direction, and supplies the laser light to the core 12. The laser light generator 15 is typically an edge emitting type of laser diode, and a laser diode used for communication, for optical system disk storage or for material analysis can be used. Examples of the laser diode include an InP system, a GaAs system and a GaN system.

The magnetic head slider 2 includes the magnetic recording element 4 for perpendicular magnetic recording. The magnetic recording element 4 has a magnetic circuit 21 for recording information. The magnetic circuit 21 is a magnet configured with a main magnetic pole 22, a return shield 23, and a linkage part 24 that physically and magnetically links these. The linkage part 24 links z-direction end parts 22d and 23d of the main magnetic pole 22 and the return shield 23 at the side far from the ABS S, respectively. The magnetic circuit 21 circulates with an open shape roughly parallel to the substrate 3. Two end parts of the magnetic circuit 21 in the circulating direction are formed as end surfaces 22c and 23c parallel to the x-y surface, respectively. The two end surfaces 22c and 23c are close to each other in the cross track direction y, and are positioned so as to face the ABS S. One end surface 22c configures the main magnetic pole end surface 22c, and the other end surface 23c configures the shield end surface 23c.

The magnetic circuit 21 is positioned within a second region R2 surrounded by two planes S3 and S4 extending parallel to the integrated surface 3a of the substrate 3. The second region R2 is situated at the upper side in the x direction than the first region R1, i.e., closer to the trailing side than the first region R1, and is away from the first region R1. Therefore, the main magnetic pole 22 (main magnetic pole end surface 22c) and the return shield 23 (shield end surface 23c) are positioned on the same side (upper side in the x direction) with respect to the generator end surface 18a in the down track direction x. An overcoat layer 25 made of $Al_2O_3$ is provided at the upper side of the magnetic circuit 21 in the x direction.

The main magnetic pole 22 has a main magnetic pole body parts 22a and a recording front end part 22b connected to the main magnetic pole body part 22a. The main magnetic pole end surface 22c, which is an end part of the recording front end part 22b, faces the ABS S, and, is positioned in the vicinity of the generator end surface 18a of the NF light generator 18. Magnetic flux is emitted toward the magnetic recording medium 14 from the main magnetic pole end surface 22c of the recording front end parts 22b. The main magnetic pole body parts 22a and the recording front end part 22b are formed with an alloy made of any two or three of Ni, Fe and Co. In particular, the recording front end part 22b is preferably made of a material with high saturation magnetic flux density Bs. The saturation magnetic flux density of the front end part 22b may be higher than the saturation magnetic flux density of the main magnetic pole body part 22a.

In order to enhance the density of the magnetic flux in the down track direction x, the recording front end part 22b is formed to be thinner in the x direction compared with the main magnetic pole body part 22a. In one example, the recording front end part 22b is formed to have 100 nm or less of film thickness by sputtering. In order to concentrate the magnetic flux in the cross track direction y, a width 22h of the recording front end part 22b in the y direction is gradually decreased toward the main magnetic pole end surface 22c from the connection part 22e of the main magnetic pole body part 22a. In the present embodiment, a side surface 22f at the side of the return shield 23 of the recording front end part 22b extends in a plane surface form in the z direction, and the side surface 22g at the opposite side extends in a curved surface form. In order to minimize the down track direction offset distance D1 between the recording front end part 22b and the NF light generator 18 as much as possible, the x-direction lower surface 22k of the recording front end part 22b is matched with an x-direction lower surface 22j of the main magnetic pole body part 22a.

The return shield 23 has a shield body part 23a and a shield front end part 23b connected to the shield body part 23a, and these are also formed with an alloy made of any two or three of Ni, Fe and Co. The shield body part 23a and the shield front end part 23b have a shield end surface 23c facing the ABS S. The shield end surface 23c is positioned in the vicinity of the generator end surface 18a of the NF light generator 18. The return shield 23 absorbs the magnetic flux that returns from the magnetic recording medium 14 at the shield end surface 23c. The front end part of the shield body part 23a may be provided at a position that is recessed in the direction z from the ABS S so that only the shield front end part 23b has a shield end surface 23c. An x-direction lower end 23e of the shield end surface 23c is substantially matched with an x-direction lower end 22k of the main magnetic pole end surface 22c. Therefore, the offset direction D1 between the main magnetic pole end surface 22c and the generator end surface 18a in the down track direction x is substantially equal to the offset direction D2 between the shield end surface 23c and the generator end surface 18a in the down track direction x. The main magnetic pole end surface 22c has a smaller height 22m in the down track direction x, and has a smaller width 22n in the cross track direction y, than the shield end surface 23c. Therefore, the shield end surface 23c has a greater area than the main magnetic pole end surface 22c. The cladding 13 is provided in the space between the main magnetic pole 22 and the return shield 23, or more particularly, the space between the recording front end part 22b and the shield front end part 23b, is filled with the cladding 13.

A center line 18e extending in the down track direction x of the generator end surface 18a extends between opposing sides 22p and 23p of the main magnetic pole end surface 22c and the shield end surface 23c, respectively. As a result, the center line 22r of the main magnetic pole end surface 22c in the down track direction x is shifted in the cross track direction y with respect to the center line 18e extending in the down track direction of the generator end surface 18a. The generator end surface 18a can have a symmetrical shape relative to the x direction, such as rectangular, square, triangular or the like, and the center line 18e is matched with a symmetrical axis. More generally, the center line 18e is a straight line that passes through the center of a FIG. 18g of the generator end surface 18a, and that extends in the x direction. Similarly, the main magnetic pole end surface 22c can also have a symmetrical shape relative to the x direction, such as triangular, square, rectangular or the like, and the center line 22r is matched with the symmetrical axis. More generally, the center line 22r is a straight line that passes through the center of a figure of the main magnetic pole end surface 22c, and that extends in the x direction. In the present embodiment, in the main magnetic pole end surface 22c and the shield end surface 23c, offset distances 22q and 23q in the cross track direction y from the center liner 18e are substantially equal.

An offset distance 26 between the main magnetic pole end surface 22c and the shield end surface 23c in the cross track direction y is smaller than the width 18f of the generator end surface 18a in the cross track direction y. That is, the opposite sides 22p and 23p of the main magnetic pole end surface 22c and the shield end surface 23c are within the width of the side 18c opposite to the main magnetic pole end surface 22c and the shield end surface 23c of the generator end surface 18a. As a result, both the opposing sides 22p and 23p of the main magnetic pole end surface 22c and the shield end surface 23c projected in the x direction shall cross the generator end surface 18a.

The magnetic recording element 4 has a coil 28 coiled around the shield body part 23a of the return shield 23. In the figure, the coil 28 is conceptually illustrated, but it is designed such that each part of the coil 28 has a cuboid cross section within which an electric current flows. Magnetic flux is generated in the main magnetic pole 22 by the electric current applied to the coil 28 from the outside. In the present embodiment, in order to avoid the interference of the coil 28 and the core 12, the coil 28 is provided around the shield body part 23a, it may be provided around the main magnetic pole 22 or the linkage part 24.

The magnetic recording medium 14 is for perpendicular magnetic recording, and has a multilayer structure where a magnetization orientation layer 14b, a soft magnetic under layer 14c, which functions as a portion of the magnetic flux loop circuit, an intermediate layer 14d, a magnetic recording layer 14e and a protective layer 14f are sequentially laminated on a disk substrate 14a. The magnetic recording layer 14e can be formed with FePt—SiO$_2$.

The magnetization orientation layer 14b stabilizes a magnetic domain structure of the soft magnetic under layer 14c by giving magnetic anisotropy in the cross track direction to the soft magnetic under layer 14c. With this, spike-like noise in the reproduced output waveform is suppressed. The intermediate layer 14d is an under layer of the magnetic recording layer 14e, and controls the orientation of magnetization and particle size.

The magnetic flux emitted from the main magnetic pole end surface 22c enters into a magnetic recording medium 14, and sequentially magnetizes each recording bit 14g in the perpendicular direction (z direction) (M1 in the figure). The magnetic flux changes its magnetic path to the in-plane direction (y direction) of the magnetic recording medium 14, and further changes it to the perpendicular direction (z direction) again in the vicinity of the return shield 23, and is absorbed by the return shield 23 (M2 in the figure). The coercive force of the magnetic recording layer 14e can be efficiently reduced by superimposing and applying NF light N to the magnetic flux emitted from the main magnetic pole end surface 22c. As a result, the recording magnetic field intensity in the perpendicular direction (z direction), required for writing, can be drastically reduced. Since magnetization reversal easily occurs by reducing the coercive force, recording can be conducted efficiently with a small recording magnetic field.

In the thermally assisted magnetic recording head, in order to enhance recording density (linear recording density) toward the down track direction x, i.e., bit per inch (BPI), it is necessary to increase the effective magnetic gradient dHeff/dx shown below.

$$\frac{dH_{eff}}{dx} = \frac{dH_h}{dx} + \frac{-dH_k}{dT}\frac{dT}{dx}$$

Herein, x is the coordinate in the down track direction; dHh is a magnetic field from the magnetic head; dHk/dT is the heat gradient of the coercive force of the magnetic recording medium 14 (T is a temperature of the magnetic recording medium 14); dT/dx is the heat gradient of the magnetic recording medium 14; and dHk/dT is a constant depending upon the magnetic recording medium 14.

In general, in the thermally assisted magnetic recording, since (dHk/dT) (dT/dx) is dominant, conventionally an effort to increase dHk/dT or dT/dx has been made. In the meantime, the present invention targets increasing dHh/dx.

Figure 5A:
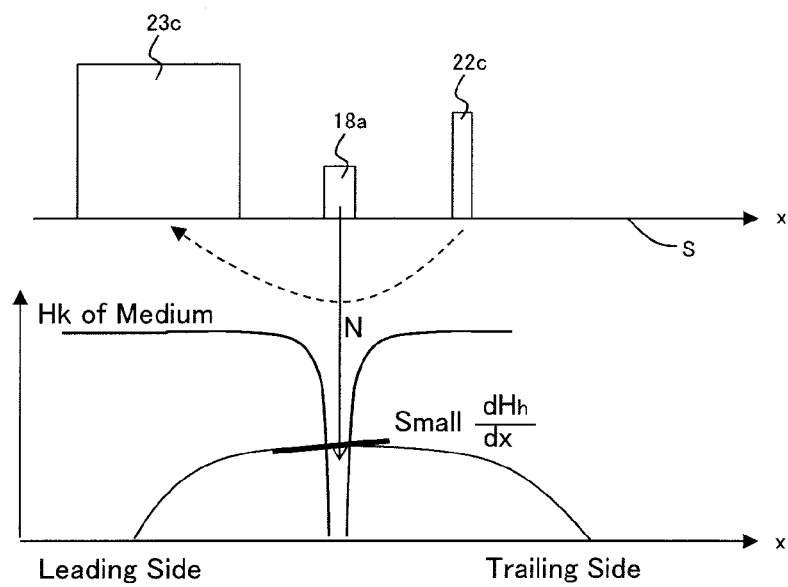
FIGS. 5A to 5C are conceptual views showing the arrangement of a magnetic circuit and a magnetic field intensity distribution in comparative examples and embodiments, respectively.
Figure 6A:
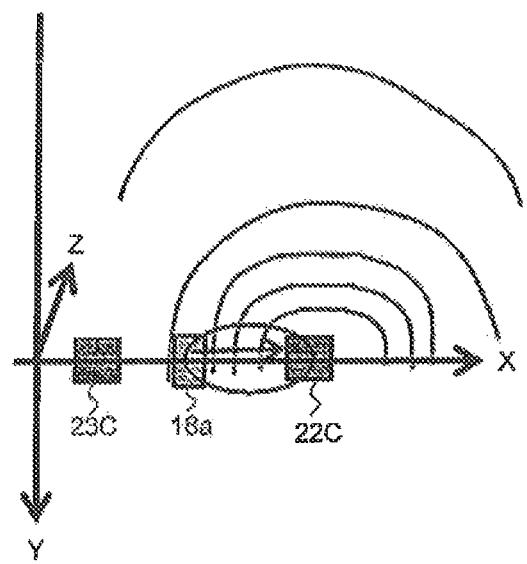
FIGS. 6A to 6B are planar conceptual views of the magnetic field intensity distribution in comparative examples and embodiments, respectively.

FIG. 5A shows the positional relationship (upper drawing) among the generator end surface 18a of the NF light generator 18, the main magnetic pole end surface 22c and the shield end surface 23c of the magnetic circuit 21; and the corresponding magnetic field intensity in the down track direction x (lower figure), in Comparative Example 1. Coercive force Hk of the magnetic recording medium in the vicinity of the generator end surface 18a is reduced by NF light that is generated on the generator end surface 18a of the NF light generator 18. Comparative Example 1 shows a typical configuration of the conventional thermally assisted magnetic recording head disclosed in US2010/0103553 and the like, and the main magnetic pole end surface 22c is positioned on the trailing side, the shield end surface 23c is positioned on the leading side, and the generator end surface 18a of the NF light generator 18 is positioned in between. A great magnetic field is generated between the main magnetic pole end surface 22c and the shield end surface 23c, so that the coercive force Hk is drastically decreased in the portion heated by the NF light generator 18. In this way, recording can be performed with a lower magnetic field than the coercive force Hk by heating the region where the magnetic field is applied to reduce the coercive force Hk. However, the magnetic gradient Hh/dx (bold line gradient in the drawing) in the down track direction of the magnetic head is not great, and the contribution of Hh/dx to the effective magnetic gradient dHeff/dx is small. This happens because the generator end surface 18a of the NF light generator 18 is positioned between the main magnetic pole end surface 22c and the shield end surface 23c, and because the interval between the main magnetic pole end surface 22c and the shield end surface 23c becomes wider. As a result, the magnetic field intensity between the main magnetic end pole 22c and the shield end surface 23c is equalized and the change in the x direction is small. FIG. 6A shows one example of the magnetic field distribution in the configuration of FIG. 5A. In the vicinity of the generator end surface 18a of the NF light generator 18 (circled region in the figure), the change in the magnetic field in the x direction is small.

Figure 5B:
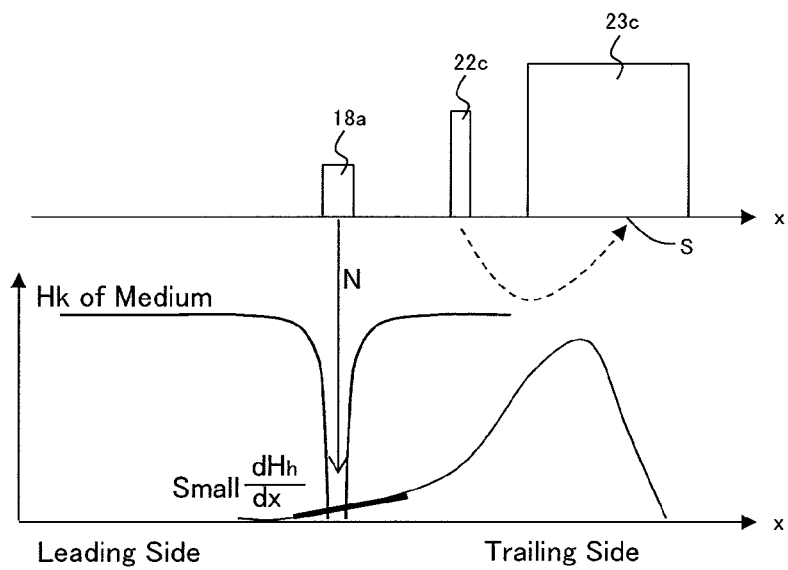

FIG. 5B shows a figure in Comparative Example 2 similar to FIG. 5A. In Comparative Example 2, a magnetic circuit for conventional perpendicular magnetic recording, which is not the thermally assisted magnetic recording method, is used. Since it is desired to place the main magnetic pole end surface 22c and the shield end surface 23c as closer to each other as possible in order to obtain high magnetic field intensity, the shield end surface 23c is positioned on the trailing side of the main magnetic pole end surface 22c. With this, interference of the generator end surface 18a of the NF light generator 18 and the shield end surface 23c can be avoided, and the shield end surface 23c can be closer to the main magnetic pole end surface 22c. In Comparative Example 2, high magnetic field intensity can be obtained, but the NF light generator 18 is not situated between the main magnetic pole end surface 22c and the shield end surface 23c so that the magnetic field intensity in the region to be heated is low and the magnetic gradient is also small. Therefore, the contribution of Hh/dx to the effective magnetic gradient dHeff/dx is also small in Comparative Example 2.

Figure 5C:
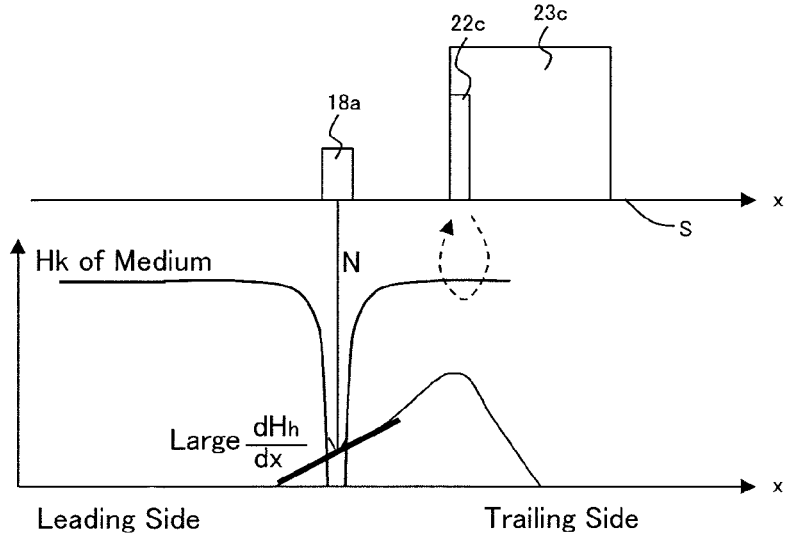
Figure 6B:
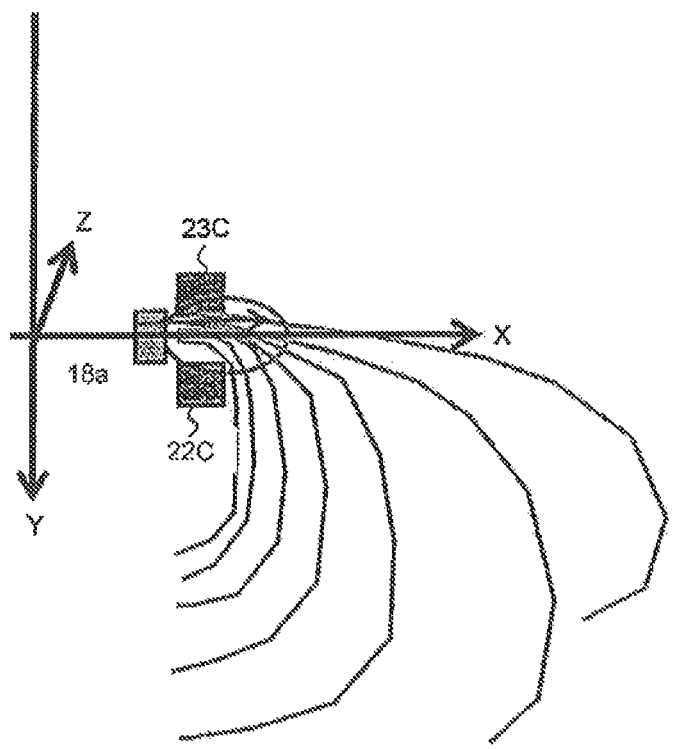

FIG. 5C shows a figure in the present embodiment similar to FIG. 5A. The present embodiment has a configuration where the shield end surface 23c is rotated around the main magnetic pole end surface 22c by 90 degrees in FIG. 5B, and the shield end surface 23c is even closer to the generator end surface 18a of the NF light generator 18. As a result, the region where the high magnetic field intensity is obtained approaches the region to be heated. Although a maximum value of the magnetic field intensity is lower compared with that in FIG. 5B, a higher magnetic gradient can be obtained in the vicinity of the heating point. The magnetic gradient is higher compared with that in FIG. 5A. FIG. 6B shows one example of the magnetic field distribution in the configuration of FIG. 5C. The change in the magnetic field in the x direction in the vicinity of the NF light generator 18 is greater in this figure as well.

In the present embodiment, high magnetic field intensity distribution can be obtained with a wider range along the drawing depth direction (cross track direction y) of FIG. 5C. However, since the recording width in each bit is defined by the width of the NF light generator, to be more precise, by the width of a region where its coercive force is lower than the magnetic field intensity due to heating, such magnetic field distribution will not affect adjacent bits in the cross track direction y.

Next, a head gimbal assembly (HGA) where the thermally assisted magnetic recording head is mounted, is explained.

Figure 7:
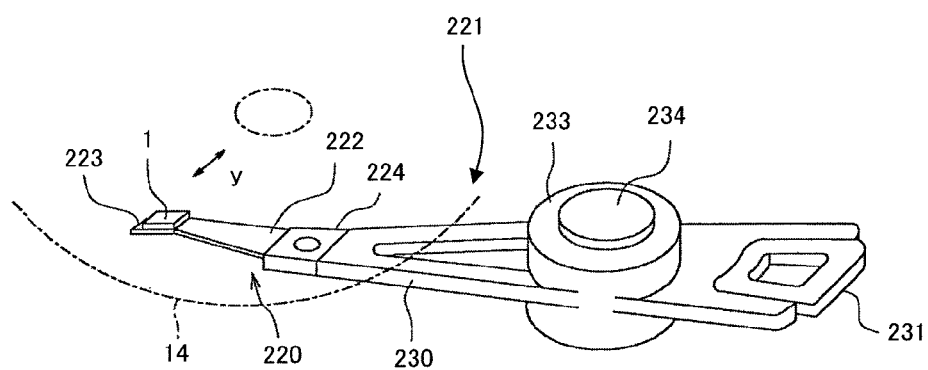
FIG. 7 is a perspective view of a head arm assembly of the present invention.

With reference to FIG. 7, a head gimbal assembly (HGA) 220 includes the thermally assisted magnetic recording head 1 and a suspension 221 that elastically supports the thermally assisted magnetic recording head 1. The suspension 221 has a plate spring-state load beam 222 formed with stainless steel, a flexure 223 provided at one end part of the load beam 222, and a base plate 224 provided at the other end part of the load beam 222. The thermally assisted magnetic recording head 1 is joined to the flexure 223 and provides an appropriate degree of freedom to the thermally assisted magnetic recording head 1. A gimbal part for keeping the position of the thermally assisted magnetic recording head 1 constant is provided at the portion where the thermally assisted magnetic recording head 1 is attached.

The assembly that the HGA 220 is attached to the arm 230 is referred to as a head arm assembly 221. The arm 230 moves the thermally assisted magnetic recording head 1 in the track crossing direction y of the magnetic recording medium 14. One end of the arm 230 is attached to a base plate 224. A coil 231, which is a part of a voice coil motor, is attached to the other end part of the arm 230. A bearing part 233 is provided in the intermediate part of the arm 230. The arm 230 is rotatably supported by a shaft 234 attached to the bearing part 233. The arm 230 and the voice coil motor that drives the arm 230 configure an actuator.

Figure 8:
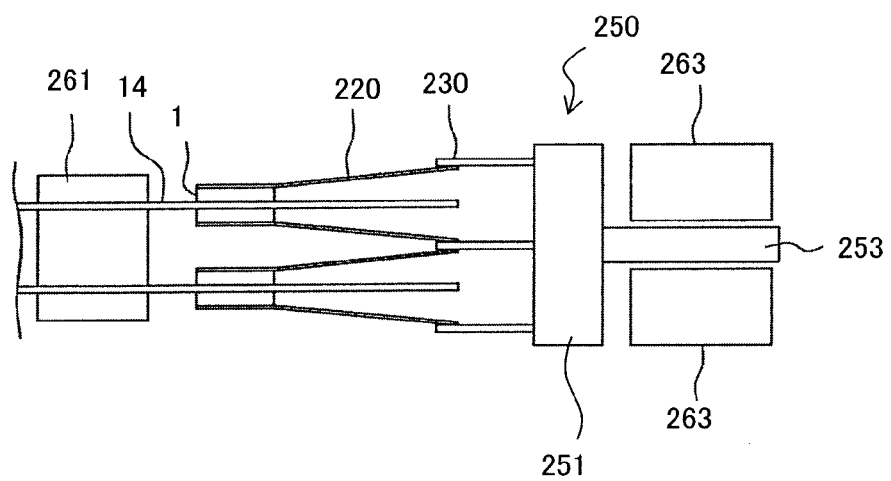
FIG. 8 is a side view of a head stack assembly of the present invention.
Figure 9:
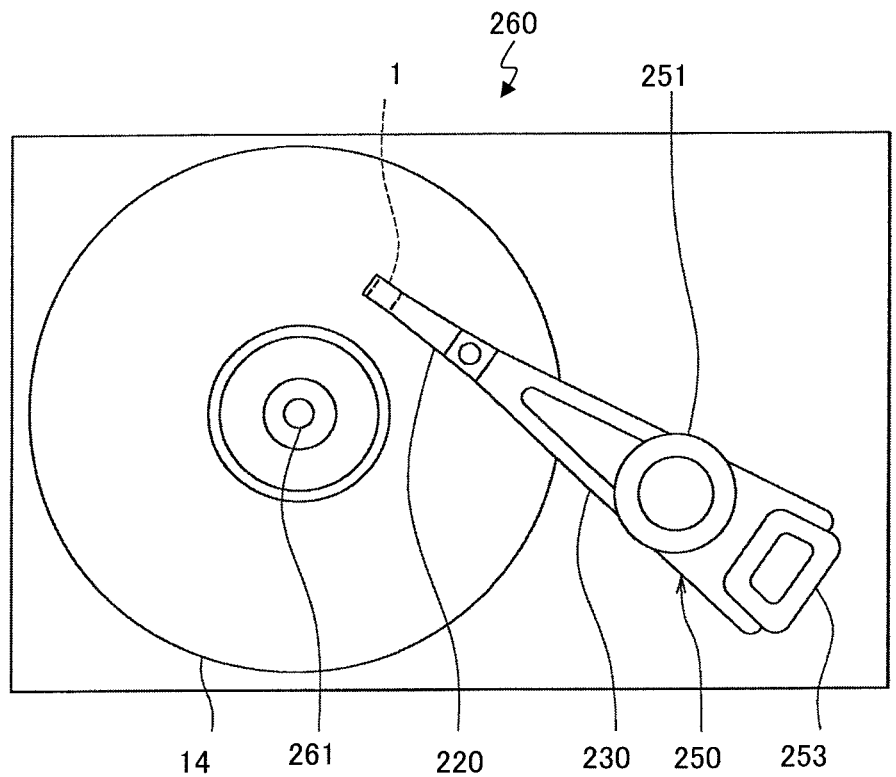
FIG. 9 is a plan view of a magnetic recording device of the present invention.

Next, with reference to FIG. 8 and FIG. 9, a head stack assembly in which the above mentioned thermally assisted magnetic recording head 1 is incorporated and a magnetic recording device are explained. The head stack assembly is an assembly where the HGA 220 is attached to each arm of a carriage having a plurality of arms. FIG. 8 is a side view of the head stack assembly, and FIG. 9 is a plan view of the magnetic recording device. The head stack assembly 250 has a carriage 251 having a plurality of arms 230. The HGA 220 is attached to each arm 230 so as to be spaced from each other and arranged side-by-side in a perpendicular direction. A coil 253, which is a part of the voice coil motor, is attached to the opposite side of the arm 230 of the carriage 251. The voice coil motor has permanent magnets 263 arranged at opposite positions across the coil 253.

With reference to FIG. 9, the head stack assembly 250 is incorporated into a magnetic recording device 260. The magnetic recording device 260 has a plurality of the magnetic recording media 14 that are attached to a spindle motor 261. Two thermally assisted magnetic recording heads 1 are arranged to be opposite in every magnetic recording medium 14 across the magnetic recording medium 14. The head stack assembly 250 except for the thermally assisted magnetic recording heads 1 and the actuator correspond to a positioning device, support the thermally assisted magnetic recording heads 1, and position the thermally assisted recording heads 1 with respect to the magnetic recording medium 14. The thermally assisted magnetic recording heads 1 are moved in the cross track direction of the magnetic recording medium 14 by the actuator, and are positioned with respect to the magnetic recording medium 14. The thermally assisted magnetic recording head 1 records information into the magnetic recording medium 14 by the magnetic recording element 4, and reproduces the information recorded in the magnetic recording medium 14 by the MR element 5.

Although the desired embodiments of the present invention were presented and explained in detail, as long as they do not depart from the effect or the scope of attached claims, readers should understand that various modifications and amendments are possible.

What is claimed is:

1. A thermally assisted magnetic recording head, comprising:
    a near-field light (NF light) generator that includes a generator end surface facing an air bearing surface (ABS), and that generates NF light on the generator end surface and irradiates a magnetic recording medium with the NF light;
    a main magnetic pole that includes a main magnetic pole end surface facing the ABS and positioned in the vicinity of the generator end surface, and that emits magnetic flux to the magnetic recording medium from the main magnetic pole end surface; and
    a return shield that includes a shield end surface facing the ABS and positioned in the vicinity of the generator end surface, and that is magnetically coupled to the main magnetic pole, and that absorbs the magnetic flux returning from the magnetic recording medium at the shield end surface, wherein
    the main magnetic pole end surface and the shield end surface are positioned to be on the same side with respect to the generator end surface in the down track direction, and are arranged side-by-side in the cross track direction;
    a center line of the generator end surface extending in the down track direction extends between opposing sides of the main magnetic pole end surface and the shield end surface.

2. The thermally assisted magnetic recording head according to claim 1, wherein
    the center line extending in the down track direction of the main magnetic pole end surface is shifted in the cross track direction with respect to the center line of the generator end surface.

3. The thermally assisted magnetic recording head according to claim 1, further comprising:
    a core that can propagate laser light as a propagating light, wherein
    the NF light generator extends to the generator end surface while being opposite to a portion of the core; couples with the propagating light that propagates through the core in a surface plasmon mode and generates surface plasmon; propagates the surface plasmon to the generator end surface; and generates the NF light on the generator end surface.

4. The thermally assisted magnetic recording head according to claim 3, further comprising:
    a laser light generator that supplies the laser light to the core.

5. The thermally assisted magnetic recording head according to claim 1, wherein
    an offset distance between the main magnetic pole end surface and the generator end surface in the down track direction is substantially equal to an offset distance between the shield end surface and the generator end surface in the down track direction.

6. The thermally assisted magnetic recording head according to claim 1, wherein
    the main magnetic pole end surface is smaller in height in the down track direction, and is smaller in width in the cross track direction, than those of the shield end surface.

7. The thermally assisted magnetic recording head according to claim 1, wherein
    the main magnetic pole end surface and the shield end surface have a substantially equal offset distance from the center line in the down track direction of the generator end surface, in the cross track direction.

8. The thermally assisted magnetic recording head according to claim 1, wherein
    an offset distance between the main magnetic pole end surface and the shield end surface in the cross track direction is smaller than a width of the generator end surface in the cross track direction.

9. The thermally assisted magnetic recording head according to claim 1, wherein
opposing side of the main magnetic pole end surface and the shield end surface of the generator end surface are within the range of the opposing side of the main magnetic pole end surface of the generator end surface and the shield end surface, in the cross track direction.

10. A head gimbal assembly (HGA), comprising:
    the thermally assisted magnetic recording head according to claim 1, and
    a suspension that elastically supports the thermally assisted magnetic recording head, wherein
    the suspension comprises:
        a flexure to which the thermally assisted magnetic recording head is attached,
        a load beam having one end connected to the flexure, and
        a base plate which is connected to the other end of the load beam.

11. A magnetic recording device, comprising:
    the thermally assisted magnetic recording head according to claim 1,
    the magnetic recording medium that is positioned to be opposite to the magnetic head slider,
    a spindle motor that rotates and drives the magnetic recording medium, and
    a device that supports the magnetic head slider and that positions the magnetic head slider with respect to the magnetic recording medium.

12. A thermally assisted magnetic recording head, comprising:
    an NF light generator that includes a generator end surface facing an air bearing surface (ABS), and that generates NF light on the generator end surface and irradiates a magnetic recording medium with the NF light; and
    a magnetic circuit that circulates roughly parallel to a substrate with an open shape having two end surfaces that are close to each other in the cross track direction, and that face the ABS, and where one end surface configures a main magnetic pole end surface that is positioned at the ABS and that emits a magnetic flux to the magnetic recording medium, and where the other end surface configures a shield end surface that absorbs the magnetic flux returning from the magnetic recording medium, respectively, wherein a center line of the generator end surface extending in the down track direction extends between opposing sides of the main magnetic pole end surface and the shield end surface.

13. A thermally assisted magnetic recording head, comprising:

a substrate, an NF light generator that is positioned within a first region surrounded by two planes extending parallel to an integrated surface of the substrate, and that includes a generator end surface facing an air bearing surface (ABS), and that generates NF light on the generator end surface and irradiates a magnetic recording medium with the NF light; and a magnetic circuit that is positioned within a second region surrounded by two planes extending parallel to the integrated surface of the substrate, which is separated from the first region, and that circulates with an open shape having two end surfaces that are adjacent to each other in the cross track direction and that face the ABS, and where one end surface configures a main magnetic pole end surface that is positioned at the ABS and that emits a magnetic flux to a magnetic recording medium, and where the other end surface configures a shield end surface that absorbs the magnetic flux returning from the magnetic recording medium, wherein a center line of the generator end surface extending in the down track direction extends between opposing sides of the main magnetic pole end surface and the shield end surface.

* * * * *